United States Patent
Figoli et al.

(10) Patent No.: US 10,457,123 B2
(45) Date of Patent: Oct. 29, 2019

(54) EXTRUDED REINFORCEMENT BEAM HAVING PROGRAMMED DEFORMATION

(71) Applicants: PSA Automobiles S.A., Poissy (FR); Constellium Singen GmbH, Singen (DE)

(72) Inventors: David Figoli, Méré (FR); Stéphane Mesaric, Le Plessis Robinson (FR); Laurent Drouot, Saint Pierre Du Perray (FR); Christian Lange, Lohningen (CH)

(73) Assignees: PSA AUTOMOBILES SA, Poissy (FR); CONSTELLIUM SINGEN GMBH, Singen (DE)

( * ) Notice: Subject to any disclaimer, the term of this patent is extended or adjusted under 35 U.S.C. 154(b) by 7 days.

(21) Appl. No.: 15/566,632

(22) PCT Filed: Apr. 8, 2016

(86) PCT No.: PCT/EP2016/057853
§ 371 (c)(1),
(2) Date: Oct. 13, 2017

(87) PCT Pub. No.: WO2016/169794
PCT Pub. Date: Oct. 27, 2016

(65) Prior Publication Data
US 2018/0086183 A1 Mar. 29, 2018

(30) Foreign Application Priority Data
Apr. 20, 2015 (FR) ...................................... 15 53483

(51) Int. Cl.
*B60J 5/04* (2006.01)

(52) U.S. Cl.
CPC ........... *B60J 5/0443* (2013.01); *B60J 5/0444* (2013.01); *B60J 5/0461* (2013.01); *B60J 5/0458* (2013.01)

(58) Field of Classification Search
CPC ...... B60J 5/0443; B60J 5/0444; B60J 5/0461; B62D 21/157
(Continued)

(56) References Cited

U.S. PATENT DOCUMENTS

| 4,919,473 A | * | 4/1990 | Laimighofer | .......... B60J 5/0444 296/187.12 |
| 5,382,071 A | * | 1/1995 | Enning | ................. B62D 25/04 296/187.12 |

(Continued)

FOREIGN PATENT DOCUMENTS

| EP | 0 395 621 A1 | 10/1990 |
| EP | 0467829 A1 | 1/1992 |
| WO | 91/10582 A1 | 7/1991 |

OTHER PUBLICATIONS

International Search Report for corresponding PCT/EP2016/057853, dated Jul. 6, 2016.
(Continued)

*Primary Examiner* — Gregory A Blankenship
(74) *Attorney, Agent, or Firm* — Sandberg Phoenix & von Gontard PC

(57) ABSTRACT

Method for producing a reinforcement beam for a vehicle, comprising at least one weak zone arranged in such a way that the bending resistance of the beam is less in said weak zone than in the rest of the beam, characterized in that it comprises, in order, a step (A) of extruding a profile part, a step (B) of cutting the profile part so as to obtain at least one profile segment, a step (C) of locally deforming the segment of the profile part in order to create the weak zone or zones.

13 Claims, 4 Drawing Sheets

(58) Field of Classification Search
USPC .................... 296/146.6, 187.12; 293/102
See application file for complete search history.

(56) References Cited

U.S. PATENT DOCUMENTS

| | | | | |
|---|---|---|---|---|
| 5,431,445 A * | 7/1995 | Wheatley | ............. | B62D 21/152 |
| | | | | 188/377 |
| 5,452,545 A * | 9/1995 | Siekmeyer | ............. | B60J 5/0444 |
| | | | | 49/502 |
| 5,466,032 A * | 11/1995 | Clausen | ................ | B60J 5/0444 |
| | | | | 296/146.6 |
| 6,145,271 A * | 11/2000 | Kossmeier | ........... | B60G 21/051 |
| | | | | 296/146.6 |
| 6,695,393 B1 * | 2/2004 | Aouadi | ................ | B62D 21/152 |
| | | | | 296/187.09 |
| 7,185,945 B2 * | 3/2007 | Dandekar | ............. | B62D 21/152 |
| | | | | 296/187.09 |
| 7,654,002 B2 * | 2/2010 | Dragoi | .................. | B62D 21/09 |
| | | | | 180/311 |
| 7,748,507 B2 * | 7/2010 | Canot | ...................... | F16F 7/12 |
| | | | | 188/377 |
| 7,887,122 B2 * | 2/2011 | Baccouche | .......... | B62D 25/082 |
| | | | | 296/187.09 |
| 8,419,111 B2 * | 4/2013 | Uchida | .................. | B60J 5/0431 |
| | | | | 296/146.6 |
| 9,266,485 B2 * | 2/2016 | Kuriyama | ............... | B60R 19/34 |
| 2003/0132643 A1 * | 7/2003 | Sakuma | ................. | B60J 5/0444 |
| | | | | 296/146.6 |
| 2007/0278819 A1 * | 12/2007 | Seksaria | ................ | B60J 5/0425 |
| | | | | 296/146.6 |
| 2008/0303306 A1 * | 12/2008 | Hirooka | ................ | B60J 5/0412 |
| | | | | 296/146.6 |
| 2010/0230997 A1 * | 9/2010 | Buschsieweke | ....... | B60J 5/0444 |
| | | | | 296/146.6 |
| 2018/0086183 A1 * | 3/2018 | Figoli | .................... | B60J 5/0444 |

OTHER PUBLICATIONS

Written Opinion for corresponding PCT/EP2016/057853, dated Jul. 6, 2016.

* cited by examiner

EXTRUDED REINFORCEMENT BEAM HAVING PROGRAMMED DEFORMATION

CROSS-REFERENCE TO RELATED APPLICATIONS

This application is the US National Stage under 35 U.S.C. § 371 of International App. No. PCT/EP2016/057853 filed on Apr. 8, 2016, and which claims priority to French App. No. 1553483 filed on Apr. 20, 2015, both of which are incorporated herein by reference.

BACKGROUND

The invention relates to a reinforcement beam for a vehicle, in particular a door reinforcement beam intended to limit intrusions into the passenger compartment in case of side impact.

In order to improve protection in case of impact, motor vehicles include beams in certain parts of their structure. These beams make it possible to transfer the energy of the impact toward parts of the structure of the vehicle in which the beams are fastened, and thus to limit intrusions into the space behind the beam. Such beams are, for example, used in the vehicle side doors, where they are commonly called side-impact reinforcement beams. In a door, a side-impact reinforcement beam extends between the front edge and the rear edge of the lining of the door, in zones preferably situated across from structural elements of the vehicle, for example the front pillar and middle pillar of the vehicle in the case of a front door. Thus, in the case of a side impact, the forces from the impact are transmitted by the side-impact reinforcement beam to the structural elements of the vehicle, namely the front pillar and the middle pillar. The drawback of these beams is that they deform essentially at the point of impact during the impact, generating significant intrusions into the passenger compartment.

In order to control the deformation of the reinforcement beam, European Pat. No. EP0510060 proposes a reinforcement beam made by extrusion, with a variable thickness in the length of the profile and a substantially rectangular section. The greatest wall thickness is located in the middle of the length of the profile; the thickest wall extends on either side and forms the impact zone. This impact zone is defined by two notches situated on the same face and substantially perpendicular to the longitudinal axis of the beam, so as to locally reduce the rigidity of the beam. Thus, in case of side impact, the beam will first bend at these notches. This design makes it possible to reduce the bending of the beam in case of impact, and therefore intrusions due to the impact. The notches are made during the extrusion of the beam by reducing the thickness of one of the walls of the beam obtained by moving an element at the extrusion head during the extrusion of the profile.

This beam is complex to produce, since it requires a special tool at the extrusion head to modify the thicknesses of the walls of the beam during the extrusion operation.

SUMMARY

The object of the present invention is to propose a production method that is easy to carry out to produce a reinforcement beam including at least one weak zone. Another object is to propose a reinforcement beam including at least one weak zone that is easy to produce.

This object is achieved using a method for producing a reinforcement beam for a vehicle comprising at least one weak zone arranged in such a way that the bending resistance of the beam is less in the weak zone than in the rest of the beam, characterized in that the method comprises, in order:

a step of extruding a profile part,
a step of cutting the profile part so as to obtain at least one profile segment,
a step of locally deforming the segment of the profile part in order to create the weak zone(s).

Thus, such a beam is simple to produce, and does not require developing complex production tools. From a profile part with a constant section obtained by extrusion, a beam including at least one weak zone is obtained by adding a simple and quick step of locally deforming the profile part. This local deformation step can be done by a punch that locally tears the profile part or preferably by a tool that plastically deforms the profile part. This local deformation step locally modifies the geometry of the section of the profile part, for example by modifying the surface of the section of the profile segment, the section here designating the section perpendicular to the extrusion direction.

In one preferred embodiment, the extrusion step forms a profile part with a plane of symmetry extending along its longitudinal axis, and in that the cutting operation is done in such a way as to obtain at least two symmetrical profile segments in pairs.

Thus, in the case of profile segments intended to produce the vehicle door reinforcement beam, this symmetry between two profile segments makes it possible to produce a reinforcement beam for a door positioned on one of the sides of the vehicle from one of the segments, and a reinforcement beam for the door situated on the other side of the vehicle from the other profile segment, minimizing cut-outs. The cuts can for example be made with a bevel.

In one advantageous embodiment, the cutting can be done such that the created profile segment is symmetrical relative to a plane perpendicular to the longitudinal axis of the profile segment and passing through the middle of its length. Thus, each obtained profile segment is identical while minimizing cut-outs.

In one embodiment, the step of locally deforming the profile segment is done at the same time as a curving operation of the profile segment by shaping intended to impart a curvature to said beam.

Thus, weak zones are created without adding an operation to the method for producing the reinforcement beam. Indeed, the reinforcement beams are generally curved. This is in particular the case for a reinforcement beam for a vehicle door, since the vehicle door includes a curved outer panel. To follow the shape of the outer panel as closely as possible, the position of the beam in the door requires the beam to be curved. After extruding the profile part and cutting the profile segment, a second operation is applied to curve the segment. This curving is obtained by shaping in a sintering tool comprising a die and a punch. It is then economically interesting to take advantage of this operation to create the weak zones by adapting the shape of the die and the punch to deform the profile segment locally, and thus to obtain the reinforcement beam.

The targeted deformation to create the weak zones can be expressed in percentage of variation of a profile segment dimension.

The variation percentage of a profile segment dimension is then typically at least 5% relative to this initial dimension of the profile, preferably at least 10%, and more preferably at least 15%.

It is also possible to express the deformation to create the weak zones by reducing the diameter of the circle in which the section of the profile fits, typically by at least 2% relative to the initial diameter of the circle in which the section of the profile fits in the plane perpendicular to the extrusion direction, preferably by at least 5%, and more preferably by at least 10%.

One thus very simply and inexpensively obtains a reinforcement beam comprising one or several weak zones from a profile part made by extrusion.

A reinforcement beam for a vehicle is also disclosed wherein the reinforcement beam comprises at least one weak zone arranged such that the resistance of the beam to bending is less at the weak zone than in the rest of the beam, obtained by the method previously described.

In one embodiment of the reinforcement beam, the reinforcement beam includes two weak zones distributed over the length of the beam.

The presence of two weak zones makes it possible to decrease the bending of the beam when a force is applied to the middle of its length.

In one embodiment of the reinforcement beam, the section of the reinforcement beam is hollow.

The beam is thus particularly light while still being strong. Furthermore, it may be locally deformed more easily to create the weak zones.

In one embodiment of the reinforcement beam, the reinforcement beam is made up of two side walls, preferably parallel and connected to one another by at least one connecting wall.

In this embodiment of the reinforcement beam, one of the side walls may comprise the weak zone(s).

Preferably, the beam is a hollow body. Advantageously, in this preferred embodiment, the side walls making up the outer contours of the hollow body can be connected to one another by one or several connecting walls. Preferably, the connecting wall(s) are not perpendicular to the side walls, and if there are several connecting walls, these connecting walls are not parallel to one another.

In one embodiment of the reinforcement beam, the weak zone(s) are situated on a generatrix of the side walls.

A vehicle door is also disclosed, wherein the vehicle door comprises at least one reinforcement beam as previously described.

A vehicle is also disclosed, wherein the vehicle comprises at least one reinforcement beam as previously described.

DESCRIPTION OF THE FIGURES

The reinforcement beam and the method of making it will be better understood upon reading the following description, provided solely as an example and done in reference to the appended drawings, in which.

The drawings are schematic illustrations to facilitate the understanding of the invention. The components are not necessarily shown to scale. The same references correspond to the same components from one figure to the next.

DETAILED DESCRIPTION

Figure 1:
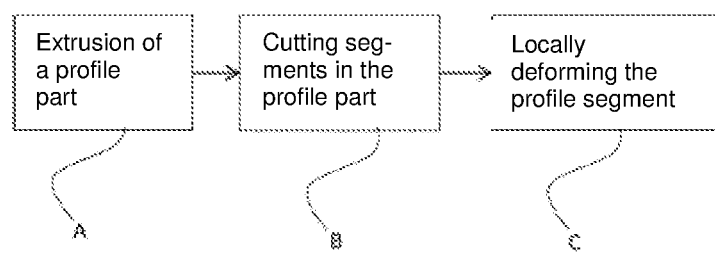
FIG. 1 shows the steps of the method for producing a beam.

FIG. 1 schematically shows the method for producing a reinforcement beam. The method comprises a first step A for extruding a profile part, followed by a step B for cutting a profile segment to the desired length, then step C for locally deforming the profile segment; advantageously, step C also comprises a curving step.

The extrusion step A produces a profile part longer than the length of the reinforcement beam that will be produced. Next, the profile part is cut in step B to obtain a segment substantially having the length of the reinforcement beam that will be produced.

Next, one or several weak zones are created during a step C for locally deforming the profile segment so as to locally reduce the bending resistance of the profile segment. The deformation can be done by localized tearing, or preferably by pressing in of the profile. This local deformation step C of the profile segment can be done at the same time as a step in which the profile segment is curved and/or its shape is altered to create a reinforcement beam whose shape is adapted to its use. For example, in the context of a reinforcement beam for a vehicle door comprising a curved outer panel, the beam can be curved so as to follow the curve of said outer panel of the door. To shape the profile segment, the latter can be placed in a shaping tool made up of a die and punch, which, by closing, deforms the segment and thus forms the reinforcement beam. The shaping tool then includes the appropriate shapes to punch and form the profile segment in the desired location(s) so as to create the weak zone(s).

In one alternative, step C may comprise several sub-steps, namely a sub-step for shaping the entire profile segment, for example by curving, and a sub-step for locally deforming the profile segment by crushing to create the weak zone(s).

Additional steps can be carried out between steps A, B or C, or after step C, including, for example, but not limited to, surface treatments, heat treatments, or piercings or nut tightening.

Figure 2:
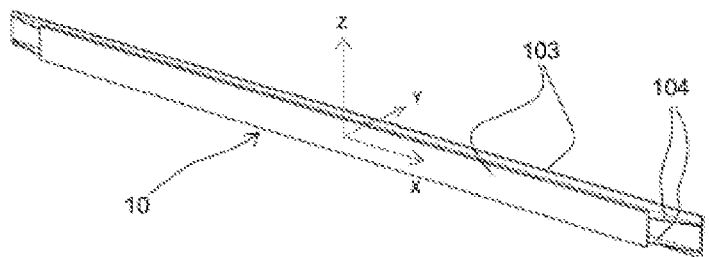
FIG. 2 is a view of a straight profile, the ends of which have been beveled.

FIG. 2 shows the profile segment 10 after the cutting step B and before the local deformation and curving step C. The profile segment 10 comprises two side walls 103 that are parallel to one another. Two end walls 104 extend between the side walls 103 so as to form a hollow body. In the embodiment described by FIG. 2, the end walls 104 are substantially parallel to one another and substantially perpendicular to the side walls 103.

Preferably, a profile part will be chosen having a plane of symmetry extending along its longitudinal axis. The profile segments 10 are obtained by cutting the profile part to identical lengths and in such a way as to obtain profile segments 10 that are at least symmetrical in pairs. For example, by defining a plane of reference formed by three axes X, Y and Z, the axis X of which is parallel to the longitudinal axis of the profile and the axes X and Y of which are perpendicular to one another and perpendicular to the axis Z, the shape of the section of the profile part is preferably chosen such that the profile part is symmetrical relative to a plane parallel to the plane XY passing midway through the length of the side wall and the profile segment 10 is obtained by making cuts along planes parallel to a same plane containing the axis Z and symmetrical relative to a plane perpendicular to the axis X.

Figure 3:
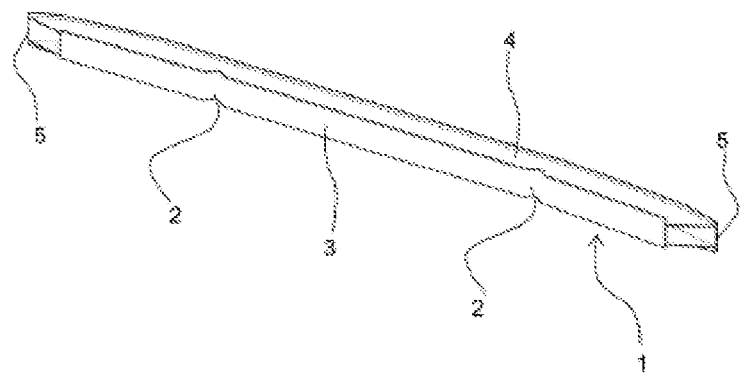
FIG. 3 is a perspective view of a reinforcement beam made from the profile of FIG. 2 and having two weak zones.

FIG. 3 shows a reinforcement beam 1 formed from the profile segment 10 illustrated in FIG. 2. The beam 1 comprises side walls 3 corresponding to the side walls 103 of the profile segment 10, and connecting walls 4 corresponding to the connecting walls 104 of the profile segment. The beam 1 comprises two weak zones 2 made by locally deforming the beam on one of the side walls 3. The deformation is done by locally crushing the beam so as to create pushing in on the side surface. These weak zones 2 reduce the bending resistance of the reinforcement beam 1. In the case of a reinforcement beam 1 intended to be installed in a vehicle door comprising a curved outer panel, and in order to follow the shape of the outer panel, the reinforcement beam 1 is curved. This curving is done by deforming the profile segment 10 of FIG. 2 using a shaping tool made up of a die and a punch, defining a cavity of the reinforcement beam 1 in which the profile segment 10 is placed. The closure of the shaping tool will impart the curve of the reinforcement beam 1. The cavity further comprises protuberances that allow local crushing of the beam 1 so as to form the weak zones 2.

Alternatively, the reinforcement beam 1 may comprise only one weak zone. In another alternative, the reinforcement beam 1 comprises two weak zones 2 or more than two weak zones 2.

In another alternative, the weak zone(s) 2 can be made by a punch that tears or at least partially cuts one of the walls 3 or 4 of the reinforcement beam 1.

Alternatively, the section of the reinforcement beam 1 can have a different shape, for example with a circular, oval or triangular section or a more complex shape. The beam 1 may also have a solid section.

The reinforcement beam 1 can be made from aluminum or an aluminum alloy, magnesium or a magnesium alloy. In one preferred embodiment, the aluminum alloy is an alloy from series 6000, more preferably alloy 6082. In one preferred embodiment, the elastic limit Rp0.2 of the aluminum alloy, measured by a tensile test according to standard ISO 6892-1, is at least 250 MPa, preferably greater than 320 MPa. In the case of a reinforcement beam 1 for a vehicle door, the weak zone(s) 2 are preferably arranged on the side of the beam 1 oriented toward the outside of the vehicle when the reinforcement beam 1 is installed on the door and the door is installed on the vehicle. Thus, in case of side impact against the vehicle, the beam will deform by bending at the weak zone(s) 2 preferably situated between the middle of the length of the reinforcement beam 1 and one of the ends of said reinforcement beam 1, which will make it possible to decrease the distance over which the reinforcement beam 1 deforms. Intrusions into the passenger area of the vehicle are thus decreased.

Figure 4:
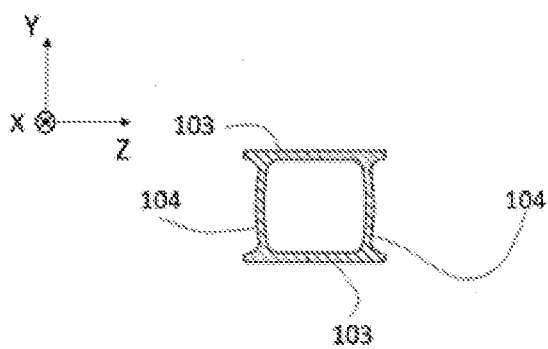
FIG. 4 is a view of a profile section used to produce the beam segment shown in FIGS. 5 and 6.
Figure 5:
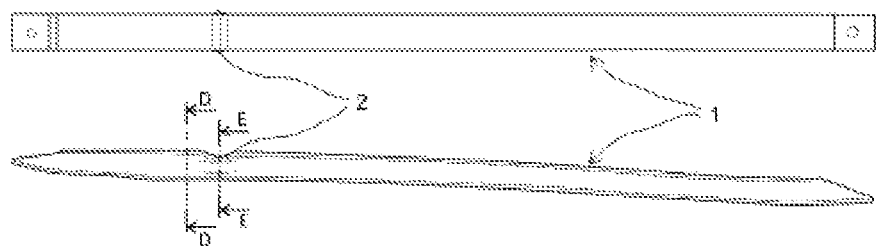
FIG. 5 is a sectional view of a reinforcement beam with a weak zone.
Figure 6:
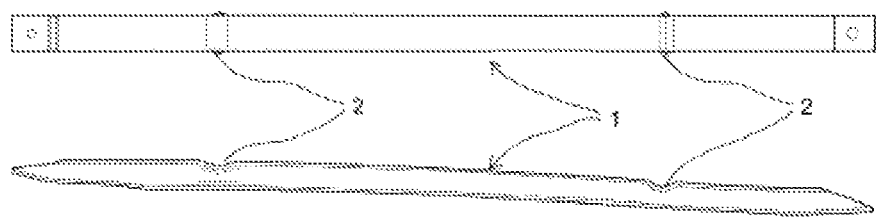
FIG. 6 is a sectional view of a reinforcement beam with two weak zones.

FIG. 4 shows the section of the profile part 10 used to produce the reinforcement beams 1 shown in FIGS. 5 and 6. The profile comprises two side walls 103 that are parallel to one another and 2.5 mm thick, and two end walls 104 that are 2 mm thick. The height of the profile part, i.e., its dimension between the faces of the two side walls 103, is 30 mm.

Figure 7:
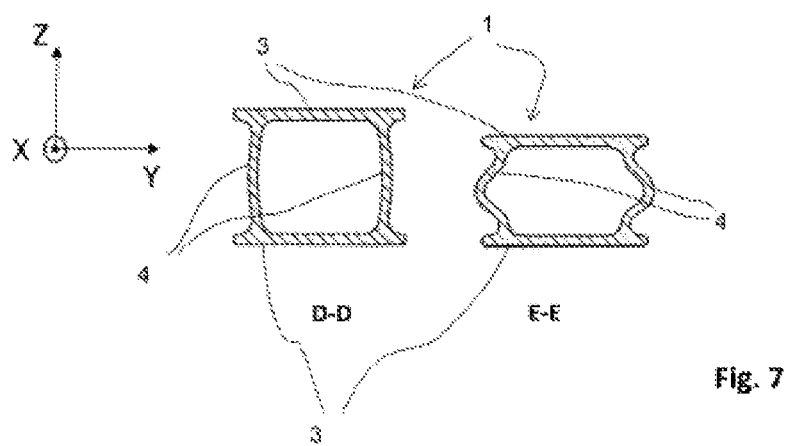
FIG. 7 is a sectional view of the reinforcement beam shown in FIG. 5, in a part not having a weak zone (section D-D) and a part representative of the weak zone (section E-E).

FIG. 5 shows a reinforcement beam 1 with a single weak zone 2 made according to the above described method. The weak zone 2 is located in the first third of the length of the reinforcement beam 1. It is made by local deformation at the same time as the curving operation. The sectional view of the weak zone 2 is shown in FIG. 7 and corresponds to section E-E identified in FIG. 5. Section D-D, also visible in FIG. 7, corresponds to part of the reinforcement beam 1 not experiencing a deformation during the curving operation. Section D-D is similar to the section shown in FIG. 4 corresponding to the initial section of the profile part. The local deformation reduces the height of the profile part by 5 mm, which corresponds to a height reduction of 17%.

FIG. 6 shows a reinforcement beam 1 with two weak zones 2 made according to the above described method. The first weak zone 2 is located in the first third of the length of the reinforcement beam 1 and the second weak zone 2 is located in the last third of the length of the reinforcement beam 1. This reinforcement beam 1 is geometrically distinguishable from the reinforcement beam 1 shown in FIG. 5 only by the second weak zone.

The presence of the weak zone(s) 2 makes it possible to reduce the intrusion into the passenger compartment. This is of interest for passenger safety.

Figure 8:
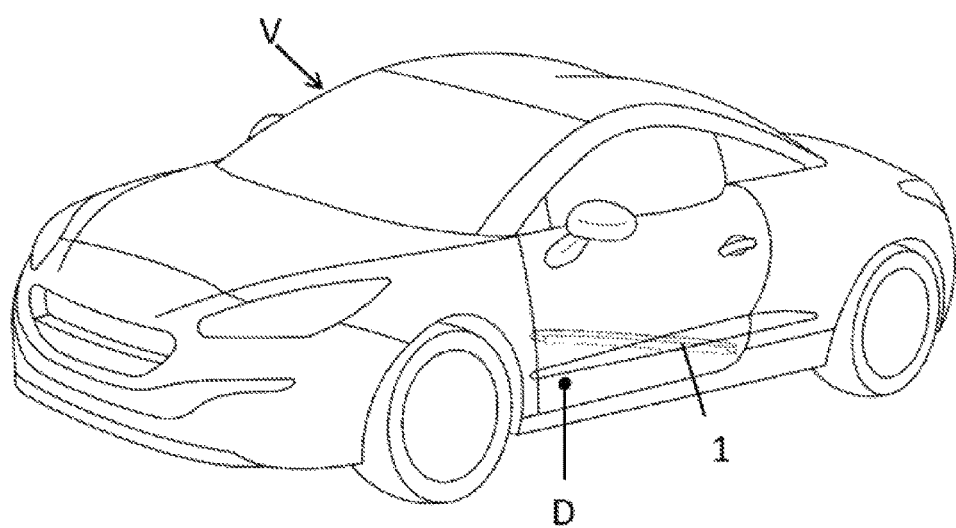
FIG. 8 is a view of a vehicle having a reinforcement beam positioned in its door.

FIG. 8 shows a vehicle V having a reinforcement beam 1 positioned in its door D.

The invention claimed is:

1. A method for producing a reinforcement beam for a vehicle comprising at least one weak zone arranged in such a way that the bending resistance of the beam is less in said weak zone than in the rest of the beam,
    wherein the method comprises, in order:
    a step of extruding a profile part,
    a step of cutting the profile part so as to obtain at least one profile segment, and
    a step of locally modifying the cross-sectional geometry of the segment of the profile part by locally pressing against a side surface of the segment such that at least one cross-sectional dimension of the segment at the site of the local modification is shortened relative to a corresponding cross-sectional dimension of the segment adjacent the site of local modification, whereby the step of locally modifying the cross-sectional geometry of the segment creates the at least one weak zone in said segment.

2. The method according to claim 1, wherein the extruding step forms a profile part with a plane of symmetry extending along a longitudinal axis of the profile part, and in that the cutting step is performed in such a way as to obtain at least two symmetrical profile segments in pairs.

3. The method for producing a reinforcement beam for a vehicle according to claim 1, including a step of curving of said profile segment by shaping intended to impart a curvature to said beam; said curving step being performed at the same time as the step of locally deforming the profile segment.

4. A reinforcement beam for a vehicle comprising at least one weak zone arranged such that the resistance of the beam to bending is less at said weak zone than in the rest of the beam, said reinforcement beam being obtained by the method according to claim 1.

5. The reinforcement beam for a vehicle according to claim 4, wherein the reinforcement beam includes two weak zones distributed over the length of said beam.

6. The reinforcement beam for a vehicle according to claim 4 wherein the reinforcement beam section is hollow.

7. The reinforcement beam for a vehicle according to claim 4, wherein the reinforcement beam comprises two side walls that are parallel and connected to one another by at least one connecting wall.

8. The reinforcement beam for a vehicle according to claim 7, wherein one of the side walls comprises the at least one weak zone.

9. A vehicle door comprising at least one reinforcement beam according to claim 4.

10. A vehicle comprising the door according to claim 9.

11. The method according to claim 1 wherein the step of locally modifying the geometry of the segment of the profile part comprises locally pushing in on a side surface of the profile part.

12. The method according to claim 3 wherein the step of curving said profile segment and said step of locally modifying the geometry of segment of the profile part are carried out at the same time.

13. The method according to claim 1 wherein the step of modifying the cross-sectional geometry of the segment renders the segment in the area of the modification generally symmetrical about a plane bisecting segment.

\* \* \* \* \*